United States Patent Office 3,441,543
Patented Apr. 29, 1969

3,441,543
THERMOSETTABLE COMPOSITION CONTAINING POLYANHYDRIDE, AN OLEFINICALLY UNSATURATED MONOOXIRANE COMPOUND AND AN OLEFINICALLY UNSATURATED MONOMER AND THE METHOD OF MAKING
William J. Heilman, Allison Park, Pa., assignor to Gulf Research & Development Company, Pittsburgh, Pa., a corporation of Delaware
No Drawing. Filed Aug. 3, 1966, Ser. No. 569,800
Int. Cl. C08f 15/40, 27/00
U.S. Cl. 260—78.5     26 Claims

ABSTRACT OF THE DISCLOSURE

A new liquid composition which is capable of being cured to a solid infusible resin and which contains a solid polyanhydride, for example the copolymer of maleic anhydride and an alpha-olefin, an olefinically unsaturated monoxirane compound which is capable of being polymerized by free-radical means, such as glycidyl methacrylate, and an olefinically unsaturated monomer capable of polymerization by free-radical means, such as styrene. The resin forms through reaction of the anhydride and epoxide groups and interaction of the olefinic double bonds of the olefinically unsaturated components.

This invention relates to new compositions capable of being cured to solid infusible resins having excellent physical and chemical resistance properties.

There are many types of resinous compositions in the art. For many applications, such as coatings, laminating, adhesives, encapsulating and filament winding, it is desirable that the resinous compositions be hard, resistant to attack by chemicals and have heigh thermal stability. It is also highly desirable that the uncured compositions be easy to mold, have an acceptable shelf life and be inexpensive. The reaction of a solid polyanhydride where the anhydride groups are not directly attached to an aromatic ring, such as one prepared by the copolymerization of maleic anhydride and an alpha olefin, with a saturated liquid monoepoxide will form a cross-linked resin suitable for the above purposes under the influence of heat, but the time required under normal curing temperatures is quite extended, and, for certain purposes, the resulting resins are of insufficient hardness. The substitution of a liquid olefinically unsaturated monooxirane compound containing as its only functional groups a single oxirane oxygen atom and an olefinic double bond capable of being polymerized by free radical means for the saturated liquid monooxirane compound overcomes the above difficulties, but the resulting resins are relatively expensive and, in some applications, have insufficient chemical and solvent resistance and volume resistivity characteristics.

It has now been found quite unexpectedly that the addition of a second olefinically unsaturated monomer containing at least one olefinic double bond capable of polymerization by free radical means and free of oxirane oxygen atoms will react to form a desirable homogeneous resin having certain improved properties, such as chemical and solvent resistance without adversely affecting the hardness and thermal stability properties of the resin.

In accordance with the invention, a new composition capable of being thermally cured to a solid infusible homogeneous resin comprises a liquid solution at below the cure temperature of a mixture of:

A solid compound containing at least two succinic anhydride groups and less than three conjugated double bonds when one of the conjugated double bonds is between the carbon atoms alpha to the carbonyl groups in a succinic anhydride group;

An olefinically unsaturated monooxirane compound containing as its only functional groups a single oxirane oxygen atom and an olefinic double bond capable of being polymerized by free radical means; and An olefinically unsaturated monomer free of oxirane oxygen atoms and containing as its only functional groups at least one olefinic double bond capable of polymerization by free radical means.

The fact that the addition of the olefinically unsaturated compounds free of oxirane oxygen atoms will form a homogeneous polymeric resin rather than a mixture of individual solid resins was quite unexpected and allows for great versatility and flexibility in obtaining finished products having a wide variety of desirable physical or chemical characteristics. The addition of the second olefinically unsaturated monomer compound can, in some instances, materially reduce the cost of the finished resin while resulting in very little to no reduction and, in some cases, improvement in the physical and chemical characteristics of the finished resins. Further, when the added olefinically unsaturated monomer is a liquid, such as styrene, desirable reductions in viscosity occur which aids in the handling of the uncured composition.

One of the components of the compositions of this invention is a solid compound containing at least two succinic anhydride groups and less than three conjugated double bonds when one of the conjugated double bonds is between the carbon atoms alpha to the carbonyl groups in a succinic anhydride group. In other words, one of the components of the compositions of this invention is a solid compound containing at least two anhydride groups where the carbon atoms alpha to the carbonyl groups in the anhydride are connected to each other through a bond selected from the group consisting of a single bond and a double bond and wherein said solid compound contains less than three conjugated double bonds when one of the conjugated double bonds is between the carbon atoms alpha to said carbonyl groups. By the term "conjugated double bonds" in this application is meant only conjugated carbon to carbon double bonds.

It is preferred that in the solid compound component containing at least two succinic anhydride groups, that the carbon atoms alpha to the carbonyl groups in the succinic anhydride be connected to each other through a single bond. At least two succinic anhydride groups are required to obtain proper crosslinking of the solid compound with the liquid monomeric organic oxirane compound to be defined below. In addition, the solid polyanhydride compounds are defined so as to exclude aromatic polyanhydrides where the carbon atoms alpha to the carbonyl groups in the anhydride group are a part of an aromatic ring. Such aromatic polyanhydrides have been found unsuitable to form the compositions of this invention as they are substantially insoluble in the liquid monomeric organic oxirane compound.

The solid polyanhydrides for use in the compositions of this invention can be prepared in any suitable manner. One suitable procedure is to polymerize an unsaturated derivative of succinic anhydride with itself or with another olefinic compound. By an unsaturated derivative of succinic anhydride is meant any organic compound comprising a succinic anhydride group and at least one carbon to carbon double bond. By a succinic anhydride group is meant the group represented by Formula I below:

FORMULA I

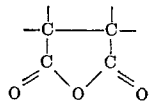

The carbon to carbon double bond can occur in the Formula I above between the carbon atoms alpha to the carbonyl groups in the succinic anhydride group or the carbon to carbon double bond can occur in the groups attached to the carbon atoms alpha to the carbonyl groups in the succinic anhydride group. For example, the solid polyanhydrides can be prepared by the homopolymerization of succinic anhydride derivatives represented by the general Formulas II through VII below.

FORMULA II

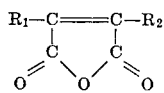

where $R_1$ is a member selected from the group consisting of hydrogen, halogen, a hydrocarbon radical and a substituted hydrocarbon radical; and $R_2$ is selected from the group consisting of hydrogen and halogen atoms. By the term "hydrocarbon radical" in this specification is meant any group of atoms consisting of carbon and hydrogen, such as alkyl, cycloalkyl, aryl, alkaryl, and aralkyl. Unless otherwise indicated, the term "alkyl" is meant to include only saturated groups. The term "hydrocarbon radical" is therefore intended to substantially exclude olefinic unsaturation in the radicals unless otherwise indicated. By the term "substituted hydrocarbon radical" in the specification is meant where one or more atoms in the hydrocarbon radical have been exchanged for a halogen; —C≡N; —OR group where R is any hydrocarbon radical as defined above; or

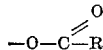

where R is any hydrocarbon radical as defined above. Examples of suitable anhydrides having the above formula are as follows:

maleic anhydride;
chloromaleic anhydride;
methylmaleic anhydride;
ethylmaleic anhydride;
hexylmaleic anhydride;
pentadecylmaleic anhydride;
octacosylmaleic anhydride;
4-propyl-8-methyl-eicosylmaleic anhydride;
cyclohexylmaleic anhydride;
phenylmaleic anhydride;
diphenylmaleic anhydride;
naphthylmaleic anhydride;
4-propyl-1-naphthylmaleic anhydride;
4-cyclohexyltridecylmaleic anhydride;
orthotolylmaleic anhydride;
paraethylphenylmaleic anhydride;
benzylmaleic anhydride;
dibromomaleic anhydride;
bromochloromaleic anhydride;
1-chloro-2-methylmaleic anhydride;
1-bromo-2-heptylmaleic anhydride;
1-chloro-2-heptadecylmaleic anhydride;
1-chloro-2-heptacosylmaleic anhydride;
1-chloro-2-cyclohexylmaleic anhydride;
1-bromo-2-phenylmaleic anhydride;
1-chloro-2-p-decylphenylmaleic anhydride;
1-chloro-2-heptylmaleic anhydride;
chloromethylmaleic anhydride;
3-bromooctylmaleic anhydride;
phenoxymethylmaleic anhydride;
phenoxydocosylmaleic anhydride;
6-pentanoxyoctylmaleic anhydride;
1-chloro-2-(2-phenoxyethyl)maleic anhydride;
cyanoethylmaleic anhydride;
4-cyanononylmaleic anhydride; and
1-bromo-2-(3-cyanohexyl)maleic anhydride.

FORMULA III

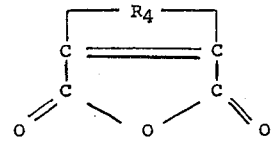

where $R_4$ is selected from the group consisting of a divalent hydrocarbon radical having between 2 and 5 cyclic carbon atoms and a substituted divalent hydrocarbon radical having between 2 and 5 cyclic carbon atoms. The total number of carbon atoms in $R_4$ can be between 3 and 36 and is preferably between 4 and 16. Examples of suitable compounds having the above Formula III is as follows:

1,2-dicarboxyliccyclobutene anhydride;
1,2-dicarboxyliccyclopentene anhydride;
1,2-dicarboxyliccyclohexene anhydride;
1,2-dicarboxyliccycloheptene anhydride;
1,2-dicarboxylic-4-chlorocyclopentene anhydride;
1,2-dicarboxylic-4-methylpentene anhydride;
1,2-dicarboxylic-4-octylcyclohexene anhydride;
1,2-dicarboxylic-5-octacosylcycloheptene anhydride;
1,2-dicarboxylic-5-cyanocyclohexane anhydride;
1,2-dicarboxylic-4-pentyl-5-octylcyclohexene anhydride; and
1,2-dicarboxylic-4(2-chloropentyl)-cyclohexene anhydride.

FORMULA IV

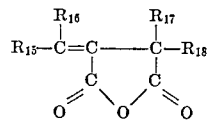

where $R_{15}$, $R_{16}$, $R_{17}$ and $R_{18}$ can be the same or different and are selected from the group consisting of hydrogen, halogen, a hydrocarbon radical and a substituted hydrocarbon radical. Examples of suitable compounds having the above Formula IV are as follows:

itaconic anhydride;
1,2-dicarboxylic-pentene-2-anhydride;
1,2-dicarboxylic-octene-2 anhydride;
1,2-dicarboxylic-tetradecene-2 anhydride;
1,2-dicarboxylic-eicosene-2 anhydride;
1,2-dicarboxylic-4-methyloctene-2 anhydride;
1,2-dicarboxylic-octadecene-2 anhydride;
2,4-dimethyl-3,4-dicarboxylic-pentene-2 anhydride;
1,1-dimethyl-1,2-dicarboxylic-octene-2 anhydride;
1,2-dicarboxylic-3-cyanohexene-2 anhydride; and
1,2-dicarboxylic-4-bromoeicosene-2 anhydride.

FORMULA V

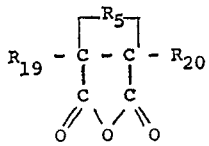

where $R_{19}$ and $R_{20}$ can be the safe or different and are selected from the group consisting of hydrogen, halogen, a hydrocarbon radical, and a substituted hydrocarbon radical; and $R_5$ is a member selected from the group consisting of an unsaturated divalent hydrocarbon radical having between 3 and 5 carbon atoms wherein the unsaturation occurs between any two adjacent cyclic carbon atoms. The total number of carbon atoms in $R_5$ can be between 3 and 36 and is preferably between 4 and 10. Compounds having the structure according to Formula V above can be prepared by the Diels-Alder reaction between a conjugated diene and maleic anhydride. For example, cyclopentadiene and maleic anhydride react to form Nadic anhydride. Castor oil also reacts with maleic anhydride to form adducts corresponding to Formula V. Examples of other suitable compounds having the above Formula V include:

bicyclo(2.2.1)5-heptene-2,3-dicarboxylic anhydride;
cis-4-cyclohexene-1,2-dicarboxylic anhydride;
7-oxabicyclo(2.2.1)5-heptene-2,3-dicarboxylic anhydride;
4-methyl-4-cyclohexene-1,2-dicarboxylic anhydride;
bicyclo(2.2.2.1)1-octene-4,5-dicarboxylic anhydride; and
2-styryl-5-phenyl-1-cyclohexene - 3,4 - dicarboxylic anhydride.

FORMULA VI

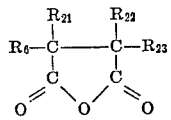

where $R_{21}$, $R_{22}$ and $R_{23}$ can be the same or different and are selected from the group consisting of hydrogen, halogen, a hydrocarbon radical, and a substituted hydrocarbon radical; and $R_6$ is a member selected from the group consisting of an unsaturated hydrocarbon radical and an unsaturated substituted hydrocarbon radical. Examples of suitable compounds having the above formula are as follows:

propenylsuccinic anhydride;
butenylsuccinic anhydride;
hexenylsuccinic anhydride;
dodecenylsuccinic anhydride;
eicosenylsuccinic anhydride;
isophopenylsuccinic anhydride;
octenylsuccinic anhydride;
octadecenylsuccinic anhydride;
1-dodecenyl-2-chlorosuccinic anhydride;
1,2-dichlorododecenylsuccinic anhydride;
1,1-dipropyl-2-methyl-2-propenylsuccinic anhydride; and
1-octyl-1-bromo-2-butyl-2-dodecenylsuccinic anhydride.

FORMULA VII

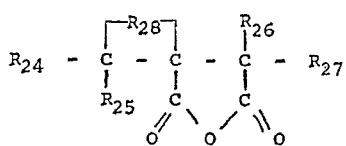

where $R_{24}$, $R_{25}$, $R_{26}$ and $R_{27}$ can be the same or different and are selected from the group consisting of hydrogen, halogen, a hydrocarbon radical and a substituted hydrocarbon radical; and $R_{28}$ is an unsaturated divalent hydrocarbon radical having four cyclic carbon atoms. The total number of carbon atoms in compounds having the Formula VII above can be between 9 and 40 and is preferably between 9 and 16. These compounds can suitably be prepared by the Diels-Alder reaction between a conjugated diene and itaconic and substituted itaconic anhydrides.

In the compounds represented by Formulas II, IV, V, VI and VII above, where R, $R_1$, $R_2$, $R_6$ and $R_{15}$ through $R_{27}$ are selected from the group consisting of hydrocarbon and substituted hydrocarbon radicals, they can have between 1 and 30 and preferably between 1 and 15 carbon atoms. The total number of carbon atoms per molecule for any particular compound represented by Formulas II through VII above can be between 4 and 40 and preferably between 4 and 20.

In addition to the homopolymerization of the unsaturated succinic anhydride compounds defined above, the solid polyanhydrides can be prepared by the copolymerization of an unsaturated succinic anhydride compound such as defined above with (1) each other, ie., copolymerization of mixtures of unsaturated succinic anhydride compounds, or (2) with any other organic monoolefin compound. For example, the unsaturated succinic anhydride compounds can be copolymerized with olefinic compounds as represented by the general Formula VIII below:

FORMULA VIII

where $R_3$ is selected from the group consisting of hydrogen, halogen, a hydrocarbon radical and a substituted hydrocarbon radical; and $x_1$ and $x_2$ are selected from the group consisting of hydrogen, halogen, a hydrocarbon radical, a substituted hydrocarbon radical and —OR where R is any hydrocarbon radical as defined above. The olefinic compound suitably has between 2 and 40 carbon atoms per molecule, preferably between 2 and 30, and more preferably between 6 and 20 carbon atoms per molecule.

The preferred olefinic compounds for use in forming the solid polyanhydride component of the compositions of this invention are those where $R_3$ in the above general formula is hydrogen and the sum of the carbon atoms in $x_1$ and $x_2$ is less than 28. The most preferred olefinic compounds are the aliphatic alpha monoolefins and, in particular, the straight-chain alpha monoolefins having between 2 and 30 carbon atoms per molecule.

The preferred copolymers are those prepared by the copolymerization of maleic anhydride with an alpha-olefinic hydrocarbon having between 2 and 30 carbon atoms per molecule, preferably between 4 and 20 carbon atoms per molecule.

It is understood that the term "olefin" is meant to include mixtures of monoolefins having between 2 and 40 carbon atoms per molecule, such as those obtained by the thermal or catalytic cracking of petroleum stocks. It is desirable that only one olefinic bond per molecule be present in the anhydride or the olefin since more than one double bond per molecule promotes gel formation and internal crosslinking. Minor amounts of diolefins, on the order of two percent or less, can, however, be tolerated in the anhydride and olefin.

Examples of olefin compounds or mixtures of olefins suitable to form the solid polyanhydride components of the compositions of this invention include:

ethylene;
propylene;
1-butene;
2-butene;
1-pentene;
2-pentene;
2-methyl-1-butene;
1-hexene;
3-hexene;
4-methyl-1-pentene;
1-heptene;
3-ethyl-2-pentene;
3,3-dimethyl-1-pentene;
1-octene;
2-methyl-1-heptene;
3,3-dimethyl-1-hexene;
1-nonene;
4-nonene;

4,4-dimethyl-1-heptene;
1-decene;
2-decene;
1-undecene;
2-methyl-4-propyl-3-heptene;
1-dodecene;
1-tridecene;
1-tetradecene;
tetraisobutylene;
1-octadecene;
1-eicosene;
2-methyl-1-nonadecene;
1-docosene;
1-heptacosene;
1-hentriacontene;
3-heptadecyl-2-eicosene;
styrene;
methyl acrylate;
ethyl acrylate;
vinylchloride;
methylvinyl ether;
vinyl acetate;
methylvinyl acetate;
vinyl naphthalene;
allyl chloride;
acrolein;
acrylic acid;
p-bromostyrene;
p-chlorostyrene;
cyclohexyl acrylate;
2,5-dichlorostyrene;
2-ethylhexyl acrylate;
p-isopropylstyrene;
allylisothiocyanate;
allyl laurate;
allylstearate;
2-ethoxyethyl acrylate;
4-ethoxystyrene;
4-methoxystyrene;
p-nitrostyrene;
octadecyl acrylate;
phenyl acrylate;
isopropyl acrylate;
sodium acrylate;
2,2,3,3-tetrafluoropropyl acrylate;
vinyl acetic acid;
vinyl benzoate;
vinyl-2-butoxyethyl ether;
vinyl n-butyl ether;
vinyl butyrate;
vinyl chloroacetate;
vinyl-2-chloroethyl ether;
vinyl n-decanoate;
vinyl ethyl ether;
vinyl formate;
methyl vinyl ketone;
ethyl vinyl ketone;
alphamethylstyrene;
2-methylpentene-1;
2-methylbutene-1;
benzyl methacrylate;
methyl methacrylate;
n-butyl methacrylate;
alpha-chlorostyrene;
alpha-chloroacrylonitrile;
2-chloroethyl methacrylate;
2-cyanoacrylamide;
n-decyl methacrylate;
vinylidene cyanide;
diethyl itaconate;
vinylidene chlorobromide;
isopropenyl propionate;
isopropenyl butyrate;
2-ethoxyethyl methacrylate;
ethyl-alpha-bromoacrylate;

isopropenyl acetate;
methacrlolein;
methacroyl acetone;
methacrylic acid;
octadecyl methacrylate;
2-phenylethyl methacrylate;
isopropyl methacrylate;
sodium methacrylate;
2,2,3,3-tetrafluoropropyl methacrylate;
tetrahydrofurfuryl methacrylate;
vinylidene chloride;
crotonic acid;
beta-chlorostyrene;
crotyl bromide;
diethyl maleate;
dilauryl maleate;
ethyl crotonate;
fumaronitrile;
methyl crotonate;
cinnamoyl chloride;
crotyl alcohol;
diamyl maleate;
di-n-butyl fumarate;
diethyl fumarate;
di-2-ethylhexyl fumarate;
di-iso-octyl fumarate;
di-iso-octyl maleate;
dimethyl maleate;
dibutyl maleate;
citraconic acid; and
beta-beta-dimethylacrylic acid.

One preferred form of the solid polyanhydride can be represented by the general formula:

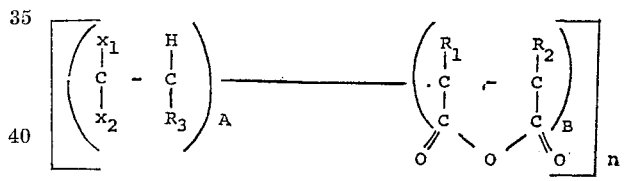

where $R_1$, $R_2$, $R_3$, $x_1$ and $x_2$ are as defined above; $n$ is an integer having a value from about 2 to about 100, or higher and preferably from 2 to about 30; A is an integer having a value from 0 to 100; and B is an integer selected from the group consisting of 1 and 2.

In the copolymerization of the unsaturated succinic anhydride compounds with the olefin compounds as defined, at least two unsaturated succinic anhydride compounds must, of course, be incorporated therein in order to produce a solid polyanhydride having at least two succinic anhydride groups therein.

The polymerization or copolymerization can be conducted in any suitable manner. One suitable copolymerization procedure involves contacting the olefinic compound with the anhydride in a suitable solvent in the presence of a free radical producing catalyst, such as a peroxide. The ratio of the olefinic compound to the anhydride can vary over a wide range, but is generally between about 1:1 and 5:1, with preferred ranges between 1:1 and 3:1. The particularly preferred molar ratio of olefin to anhydride compound will depend to a large extent on the specific olefins and anhydrides employed. For example, for the copolymerization of aliphatic mono-alpha-olefins and maleic anhydride, the ratio of olefin to anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used in which case much lower temperatures, i.e. −80° C., can be employed. The upper reaction temperature is determined by the boiling point of the components of the reaction mixture and the predominance of unwanted side reactions.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g., or higher, but the preferred pressure is atmospheric.

The copolymers can be produced in any suitable solvent which at least partially dissolves both of the reacting components. Suitable solvents include, for example: n-pentane; n-hexane; n-octane; methylene chloride; tetrahydrofuran; di-isopropyl ether; carbon tetrachloride; cyclohexane; methylcyclohexane; n-propylacetate; toluene; benzene; ethylbenzene; cumene; xylene; ethyl-n-butyrate; tetrachloroethylene; di-n-butylether; n-amylacetate; anisol; cyclohexanone; bromobenzene; methylorthotolylether; acetone; methylethylketone; and ethylbenzylether.

The catalyst to employ can be any free radical producing material well known in the art. Preferred catalysts are the organic peroxides, such as benzoyl, lauryl and tertiary butyl peroxide. Other suitable free radical producing materials include substituted azo compounds, such as alpha-alpha′-azobisisobutyronitrile.

The molecular weight of the polyanhydride component of the compositions of this invention can vary over a wide range. The dilute solution viscosity (which is a measure of molecular weight) of five grams of the polyanhydride per deciliter of acetone at 77° F. can suitably be between about 0.01 and 2 or more, and is preferably between about 0.03 and 0.95 deciliter per gram.

The composition of this invention also comprises an olefinically unsaturated monooxirane compound containing as its only functional groups a single oxirane oxygen atom and at least one olefinic double bond capable of being polymerized by free radical means. By a functional group is meant a group such as an oxirane oxygen atom which would participate in the anhydride-monoepoxide crosslinking reaction, i.e. combine chemically with the anhydride, such as for example, −OH, −SH and −NH groups. By an oxirane oxygen atom is meant an oxygen atom directly connected to two carbon atoms which carbon atoms are connected to each other, i.e.

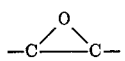

A monooxirane compound is frequently termed a monoepoxide. The monooxirane compound must also contain at least one, and preferably only one, olefinic double bond capable of being polymerized by free radical means. By free radical means in this application is meant thermal means, i.e. heat; ultra-violet light; radiation and well known free radical chemical initiators, such as organic peroxides, azo compounds, etc., as mentioned above. The liquid monooxirane compounds are preferred. Suitable ethylenically unsaturated monooxirane compounds are those which contain, in addition to the single oxirane oxygen, at least one terminal CH$_2$=C< grouping.

The monooxirane compounds used in the compositions of this invention are the alpha-olefinically unsaturated monooxirane compounds which contain substituents directly connected to the beta-carbon atom of the alpha olefin, which substituents result in a net electron withdrawal from the alpha olefin double bond. In other words, the alpha olefin double bond is activated for polymerization by substituents or groups which effect an electron withdrawal from the olefinic double bond. Electron withdrawing groups are well known in the art and include, for example, halogen;

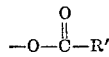

where R′ is any organic radical;

where R′ in any organic radical; −C≡N; an aromatic organic radical;

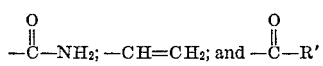

where R′ is any organic radical. Substituents or groups which donate electrons are undesirable but can be used if the net effect of the two substituents on the beta-carbon atom of the alpha olefin is to effect an electron withdrawal and result in a monomer which is capable of polymerization by free radical means. Substituents which donate electrons are also well known in the art and include, for example, −OR′, where R′ in any organic radical; −CR$_{30}$R$_{31}$R$_{32}$, where R$_{30}$, R$_{31}$ and R$_{32}$ are selected from the group consisting of hydrogen and any organic radical. For example,

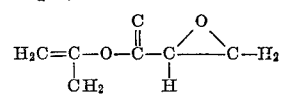

contains an electron donating group (−CH$_3$) and an electron withdrawing group

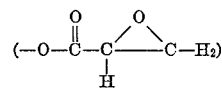

of about equal power on the beta-carbon atom. This compound is therefore unsuitable because the net effect is that there is no electron withdrawal from the double bond. In a similar manner, allyl glycidyl ether, i.e.,

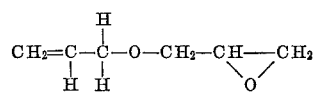

is not a suitable monooxirane compound for the compositions of this invention since the

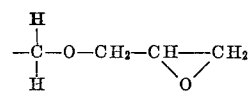

group donates electrons to the double bond. On the other hand, compounds having the general formula

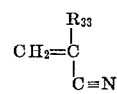

where R$_{33}$ is an alkyl group containing a single oxirane oxygen atom, readily polymerize even though R$_{33}$ is an electron donating group because −C≡N is such a strong electron withdrawal group that the net effect, i.e. the summation of the electron donating power of the R$_{33}$ group and the electron withdrawal power of the −C≡N group is that electrons tend to be withdrawn from the olefinic double bond, thus activiating it for polymerization. As a further example, a compound such as:

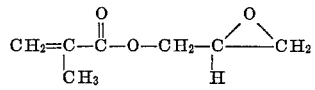

will readily polymerize even though the beta-carbon atom contains the electron donating methyl group, since again the electron withdrawal power of the

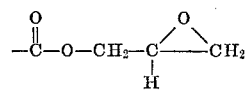

group is greater than the electron donating power of the CH₃ group.

The preferred monoxirane compounds are the alpha-olefinically unsaturated terminal monoepoxides represented by the general formula:

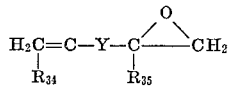

where $R_{35}$ is selected from the group consisting of hydrogen and a saturated hydrocarbon radical having between 1 and 10 carbon atoms; where $R_{34}$ is selected from the group consisting of hydrogen; halogen; —C≡N;

—COOR″ where R″ is any saturated hydrocarbon radical having between 1 and 10 carbon atoms; and

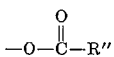

where R″ is as defined when Y is selected from the group consisting of

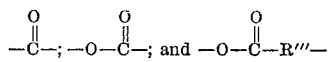

where R‴ is any divalent hydrocarbon radical having between 1 and 20 carbon atoms; and where $R_{34}$ is selected from the group consisting of a saturated hydrocarbon radical having between 1 and 10 carbon atoms; hydrogen; halogen; —C≡N;

—COOR″, where R″ is as defined; and

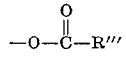

where R‴ is as defined when Y is

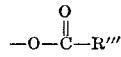

where R‴ is any divalent hydrocarbon radical having between 1 and 20 carbon atoms.

In general, the total number of carbon atoms in the monooxirane compound is suitably between 4 and 30, and preferably between 4 and 10 carbon atoms per molecule. The total number of carbon atoms in the preferred monooxirane compound should be such that the compound is liquid at about room temperature. Examples of suitable compounds include, but are not limited to, glycidyl methacrylate; glycidyl acrylate; glycidyl propacrylate; 3,4-epoxy butene-1; 3,4-epoxy-3-chloro butene-1; 3-keto-4,5-epoxy pentene-1; 2-methyl-3-keto-4,5-epoxy pentene-1,2-cyano-3-keto-4,5-epoxy pentene-1; 3-keto-4-methyl-4,5-epoxy pentene-1; epoxy ethyl propenoate

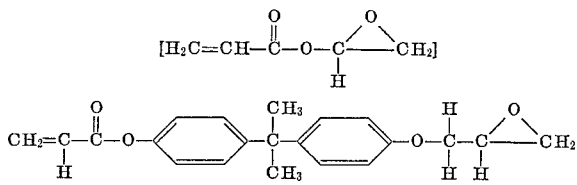

2-methyl-2,3-epoxy propyl acrylate; 2-decyl-2,3-epoxy propyl acrylate; 4-methyl-4,5-epoxy pentyl acrylate; 4-methyl-4,5-epoxy pentyl methyl acrylate; 2-methyl-2,3-epoxy propyl methyl acrylate; vinyl 3,4-epoxy butanoate

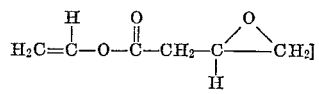

vinyl 3-methyl-3,4-epoxy butanoate; and vinyl 7,8-epoxy octanoate.

The compositions of this invention also comprise a second olefinically unsaturated monomeric compound free of oxirane oxygen atoms and containing as its only functional group at least one olefinic double bond capable of polymerization by free radical means. This second olefinically unsaturated compound must be free of oxirane oxygen atoms and other functional groups which would participate in the anhydride-monoepoxide crosslinking reaction, i.e. combine chemically with the anhydride or epoxide, such as for example, —OH, —SH, and —NH groups. The preferred olefinically unsaturated compounds are those containing between 2 and 20 carbon atoms and between 1 and 2 olefinic double bonds capable of polymerization by free radical means. More preferably, the olefinically unsaturated compounds are those that have between 2 and 10 carbon atoms which are liquid at or about room temperature. It is only essential that these olefinically unsaturated monomeric compounds form a liquid solution with the selected solid polyanhydride and the selected olefinically unsaturated monooxirane compound at a temperature less than the cure temperature of the three component mixture.

Olefinically unsaturated monomeric compounds which polymerize by a free radical mechanism are well known in the art and are generally alpha-olefinically unsaturated compounds which contain substituents directly connected to the beta-carbon atom of the alpha-olefin, which substituents in a manner similar to the discussion with respect to the unsaturated monooxirane compound above results in a net electron withdrawal from the alpha olefin double bond. In other words, the alpha olefin double bond is activated for polymerization by substituents or groups which effect an electron withdrawal from the olefinic double bond. Electron withdrawing groups are well known in the art and include, for example, halogen;

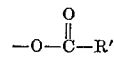

where R′ is any organic radical;

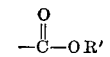

where R′ is any organic radical; —C≡N; an aromatic organic radical;

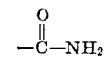

CH=CH₂; and

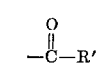

where R′ is any organic radical. Substituents or groups which donate electrons are undesirable but can be used if the net effect of the two substituents on the beta-carbon atom of the alpha olefin is to effect an electron withdrawal and result in a monomer which is capable of polymerization by free radical means. Substituents which donate electrons are also well known in the art and include, for example, —OR′, where R′ is any organic radical; —CR₃₀R₃₁R₃₂, where R₃₀, R₃₁ and R₃₂ are selected from the group consisting of hydrogen and any organic radical.

The olefinically unsaturated compounds defined above are capable of polymerization by free radical means to produce a homopolymer. In addition, the olefinically unsaturated monooxirane compounds defined above are also capable of polymerization by free radical means to produce a homopolymer. When two olefinically unsaturated compounds both of which are capable of homopolymerization are admixed and subjected to a free radical polymerization, a mixture of homopolymers, a copolymer, or a mixture of both can be obtained depending on the concentration of the components in the mixture and their reactivity ratios. Fred W. Billmeyer, Jr., in his textbook of Polymer Science, published by Interscience in 1962, defines the monomer reactivity ratios $r_1$ and $r_2$ as the ratios of the rate constants for a given radical adding its own monomer to the other monomer. In other words, a reactivity ratio for a given monomer can be defined as the ratio of the reaction rate constant to the formation of polymer of the given monomer with itself, divided by the reaction rate constant to the formation of copolymer of the given monomer with a second added monomer. If $r_1$ is greater than one, this means that monomer one prefers to add to itself, while if $r_1$ is less than one, this means that a given monomer prefers to add to the second added monomer. In the compositions of the subject file the situation is further complicated by the fact that, while the olefinically unsaturated monomeric compound free of oxirane oxygen atoms is capable of homopolymerization of copolymerization with the olefinically unsaturated monooxirane compound, the olefinically unsaturated monooxirane compound is additionally capable of reacting and does react with the solid polyanhydride to form a crosslinked polymer. It has been found quite unexpectedly that instead of the olefinically unsaturated compound homopolymerizing or forming a separate copolymer solid with the olefinically unsaturated monooxirane compound, a single homogeneous solid resin is formed on curing provided the components of the composition form a liquid solution at a temperature within the gel time. While it is not certain, it is believed that the unusual and unexpected results are obtained because the bulk of the curing reactions occur in the gel phase. The presence of a gel phase occurs on an initial crosslinking of the polyanhydride and the saturated monooxirane compound. The three components of the composition of this invention must form a liquid solution before this gel phase occurs in order to form a homogeneous solid resin on final curing. By a homogeneous resin is meant a resin where the components are combined chemically with each other and which has a uniform structure throughout, that is, a homogeneous resin is one which is soluble to less than ten weight percent of the added olefinically unsaturated oxirane oxygen free monomer in a solvent, such as acetone, for the homopolymer of said monomer over a period of twenty-four hours. It is believed that the presence of the gel phase allows sufficient time for the various crosslinking and copolymerization reactions to occur. The preferred olefinically unsaturated compounds for use in the compositions of this invention are those having reactivity ratios less than three at 60° C. and more preferably, the olefinically unsaturated monomers should have reactivity ratios less than one.

The preferred olefinically unsaturated monomeric compounds are those selected from the class consisting of:

(1) Vinyl monomers having the general formula:

$$H_2C=\underset{X}{\overset{H}{\underset{|}{C}}}-X$$

where $x$ can be any aryl group having between 1 and 3 rings; halogen;

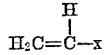

$-C\equiv N$; $-OR_{36}$, where $R_{36}$ is any hydrocarbon radical having between 1 and 20 carbon atoms which can be substituted by halogen and $-C\equiv N$ groups;

where $R_{36}$ is as defined; and

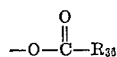

where $R_{36}$ is as defined;

(2) Beta substituted propylenes having the general formula:

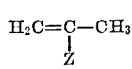

where Z is selected from the class consisting of

where $R_{36}$ is as defined; $-C\equiv N$; phenyl; and

and (3) Vinylidene compounds having the general formula:

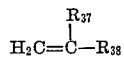

where $R_{37}$ and $R_{38}$ can be the same or different and are selected from the class consisting of $-C\equiv N$ and halogen.

The styrene-type compounds, such as styrene, alpha-methyl styrene and p-chlorostyrene, and the lower alkyl acrylates and methacrylates, such as methyl and butyl acrylate and methacrylate, are particularly preferred.

Examples of suitable olefinically unsaturated monomeric compounds include:

$C_6H_5CH=CH_2$ (styrene);
alpha-methyl styrene;

$$CH_2=CH-\overset{O}{\underset{\|}{C}}-NH_2 \text{ (acrylamide)};$$

$CH_2=CH-C\equiv N$ (acrylonitrile);
$CH_2=CH-O(CH_2)_{11}CH_3$ (vinyl dodecyl ether);
$CH_2=CH-O-(CH_2)_3CH_3$ (vinyl butyl ether);

$$CH_2=\underset{\underset{CH_3}{|}}{C}-\overset{O}{\underset{\|}{C}}-OCH_3 \text{ (methyl methacrylate)};$$

$$CH_2=\underset{\underset{CH_3}{|}}{C}-C\equiv N \text{ (methacrylonitrile)};$$

$$CH_2=\underset{\underset{CH_3}{|}}{C}-\overset{O}{\underset{\|}{C}}-NH_2 \text{ (methacrylamide)};$$

$CH_2=CCl_2$ (vinylidene chloride);
$CH_2=C(C\equiv N)_2$ (vinylidene cyanide);

$$CH_3\overset{O}{\underset{\|}{C}}-NH-C_6H_5-CH=CH_2 \text{ (p-acetyl aminostyrene)};$$

$CH_2=CHCHO$ (acrolein);

$$CH_2=\underset{\underset{CH_3}{|}}{C}-\overset{O}{\underset{\|}{C}}-CH_2CH=CH_2 \text{ (allyl methacrylate)};$$

$$CH_2=\underset{\underset{CH_3}{|}}{C}-\overset{O}{\underset{\|}{C}}-NH-C_6H_4-OCH_3 \text{ (N- p-anisyl)methacrylamide)};$$

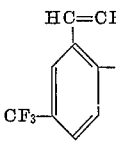
-CF$_3$ (2,5-bis(trifluoromethyl)styrene);

$BrC_6H_4CH=CH_2$ (m- and p-bromosyrene);
$ClC_6H_4CH=CH_2$ (m- and p-chlorosyrene);
$CH_2=CH-CH=CH_2$ (butadiene);

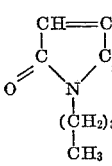
(N-butyl maleimide);

$$CH_2=\underset{\underset{}{|}}{\overset{Cl}{C}}-CH=CH_2 \text{ (2-chloro-1, 3-butadiene)};$$

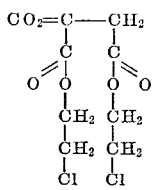

ClC₆H₄—NH—C(=O)—C(CH₃)=CH₂ (N-(p-chlorophenyl)methacrylamide);
4-chloro-1-vinylnaphthalene;
6-chloro-2-vinylnaphthalene;
p-cyanostyrene;
1-dioxy-1-methacrylamido-D-glycital;
1-acrylamido-1-dioxy-D-glycital;
di-n-butyl itaconate;
di-b-chloroethyl itaconate;
2,3-dichloro-1,3-butadiene;
2,5-dichlorostyrene;
1,1-dihydroperfluorobutyl acrylate;
N-(1,1-dihydroperfluorobutyl)-N-ethyl acrylamide;
p-dimethylaminostyrene;
dimethyl itaconate;
2,4-dimethyl-6-vinyl-s-triazine;
N,N-divinylaniline;
dinvinyl ether;
divinyl sulfide;
divinyl sulfone;
divinyl tartrate;
ethyl 1-acetoxy acrylate;
N-ethyl-N,1,1-dihydroperfluorobutylacrylamide;
N-ethyl methacrylamide;
ethyl methacrylaminoacetate;
ethyl vinyl oxalate;
5-ethyl-2-vinylpyridine;
5-ethyl-2-vinylpyridine-N-oxide;
N-ethyl-N'-vinylurea;
ethyl vinyl sulfide;
2-fluorobutadiene;
N-(m-fluorosulfonylphenyl)acrylamine;
N-(m-fluorosulfonylphenyl)methacrylamide;
fumaronitrile;
p-iodostyrene;
isopropenyl isocyanate;
p-methoxystyrene;
methyl acrylate;
methyl 1-chloroacrylate;
N-methyl methacrylamide;
alpha-methyl styrene;
p- and m-methyl styrene;
2-methyl-4-vinyl pyridine;
m-nitrostyrene;
pentachlorostyrene;
N-phenyl methacrylamide;
N-p-tolylmethacrylamide;
3-trifluoromethylstyrene;
vinyl acetate;
vinyl bromide;
N-vinyl carbazole;
vinyl chloride;
vinyl ethyl sulfide;
1-vinyl-3-ethylurea;
vinyl isothiocyanate; and
vinyl isocyanate.

As noted above, in order to obtain a finally cured resin which is homogeneous and grain-free, the uncured compositions must form a liquid solution at a temperature less than the curing temperature and preferably should form a liquid solution at about room temperature. By a temperature less than the curing temperature or below the cure temperature is meant a temperature where it requires less time for the components to form a liquid solution than to form a gel structure from the reaction of the polyanhydride with the monooxirane compound. That is, it requires a certain amount of time at any given temperature for any particular defined polyanhydride and defined olefinically unsaturated monomers to form a liquid solution or to react at least partially to form a gel structure. The formation of a gel structure substantially halts further solution of any remaining solid components and a finally cured resin having a grainy structure with inferior physical and chemical properties will result. As the temperature is increased, the rate of solution increases, but usually the rate of reaction to form the gel structure increases even faster. It is only essential that the components of the compositions of this invention be capable of forming a liquid solution at some temperature and in a time less than that required for the same composition to form a gel at the same temperature. The polyanhydride component is a solid at room temperature. The olefinically unsaturated monooxirane compound and the olefinically unsaturated monomeric compound free of monooxirane oxygen atoms are normally liquids at room temperature, although they can, in some instances, be solids. At least one of the olefinically unsaturated monomeric components must be sufficiently low melting that it will liquify and form a liquid solution with the solid polyanhydride and remaining olefinically unsaturated component before a gel structure forms, i.e. at a temperature less than the cure temperature. It is, of course, preferred that at least one of the olefinically unsaturated components be liquid at room temperature and be used in an amount sufficient to dissolve the remaining components of the composition to form a liquid solution at room temperature. More preferably, both of the olefinically unsaturated components are liquids at room temperature, which liquids must, of course, be mutually soluble, and capable of solubilizing the solid polyanhydride employed.

In general, the molar ratio of the polyanhydride to monoepoxide compound to employ in the compositions of this invention can vary over a wide range. The specific ratio to employ with any given monoepoxide is determined, first of all, by whether a liquid solution of the polyanhydride in the monoepoxide-olefinically unsaturated monomeric oxirane oxygen free compound is obtained at a temperature below the curing temperature. The liquid solution hardens at least in part due to a crosslinking reaction occasioned by the interaction of the anhydride and epoxide groups to form ester linkages. Ether linkages also form due to the interaction of several epoxide groups. Since the polyanhydride has many reactive anhydride groups per molecule while the monooxirane compound has only one reactive epoxy group per molecule, the ratio of the anhydride to epoxy compound (more simply the A/E ratio) is usually spoken of and given as an equivalent ratio. Theoretically, one equivalent of the polyanhydride compound can react with one equivalent of the monooxirane compound. One equivalent of the monooxirane compound is, of course, one mole since there is only one oxirane oxygen atom per molecule. The anhydride equivalent of the polyanhydride is defined as the average number of anhydride groups per molecule. The anhydride equivalency of the polyanhydrides used in the compositions of this invention is at least two, i.e. the polyanhydride has at least two anhydride groups per molecule. The anhydride to epoxide equivalent ratio, i.e. the A/E ratio, can suitably be between about 0.1:1 and 5:1, but is preferably between 0.3:1 and 2:1, more preferably between 0.5:1 and 1.5:1, for the preparation of compositions having the best physical and chemical properties.

The amount of the olefinically unsaturated monomeric compound which is free of oxirane oxygen atoms can vary between 1 and 200 parts per hundred parts of resin by weight (phr.) with preferred amounts between 5 and 150 phr. with the exact amount depending on the properties desired in the finished product. By "resin" is meant the polyanhydride - monooxirane mixture. The maximum amount of any particular unsaturated monomer to employ will depend upon its compatibility in the finished product. That is, as noted above, the olefinically unsaturated monomer must form a homogeneous liquid solution with the solid polyanhydride and monooxirane components before the time necessary for a gel structure to form. However, if the concentration of the olefinically unsaturated oxirane oxygen free monomer is too high, a portion of it will form as separate solid polymer phase and thus fail to give a homogeneous solid polymer product, as desired. When this occurs, the product is grainy in appearance and has inferior properties. For example, styrene has been found to form a liquid solution with various polyanhydride-monoepoxide compositions in amounts between 1 and 150 phr. In all cases, the styrene was compatible for the product was a homogeneous solid. On the other hand, while vinyl acetate forms a liquid solution with a hexene-1-maleic anhydride copolymer-glycidyl methacrylate composition, it (vinyl acetate) is only compatible in amounts of 10 phr. or less when castings are made or 50 phr. or more when laminates are made. With other polyanhydride-monoepoxide systems as defined, more or less vinyl acetates may be compatible. In all cases, the concentration of the unsaturated oxirane oxygen free monomer must fall within the limits defined above.

It has been found that the above described liquid solutions of a polyanhydride, an olefinically unsaturated monoepoxide and an olefinically unsaturated compound free of oxirane oxygen atoms are capable of being cured thermally in relatively short periods of time to a solid homogeneous infusible resin having excellent hardness and volume resistivity properties, whereas, liquid solutions of the same polyanhydrides and saturated monoepoxides take much longer thermally to result in finished resins which do not possess the desired hardness characteristics of the new compositions of this invention.

The curing of the liquid solutions described above is believed to proceed, not only by the anhydride-epoxide crosslinking reaction, but by polymerization reactions involving the olefinically unsaturated components. The crosslinking reaction proceeds, as noted, by the interaction of an anhydride function of the polyanhydride with the epoxide function of the unsaturated monoxirane compound while the polymerization reactions proceed in some unknown sequence and manner through the interaction of the olefinic double bonds of the olefinically unsaturated components. The curing temperature has been found to be critical in order to obtain finally cured resins which have a hardness in excess of 80 on the Barcol 935 hardness scale. The use of curing temperatures less than 80° C. results in finally cured resins which are solid, but have inferior hardness properties. Curing temperatures are therefore suitably between 80° C. and 250° C., preferably between 90° C. and 200° C. for times between 0.1 and 50 hours, preferably between 2 and 20 hours, the higher temperatures requiring the shorter curing times. The time required to reach the desired curing temperature is not considered part of the curing time. Curing can also occur in stages, if desired, that is, a first stage curing at a relatively low temperature of between 50° C. and 100° C. for between 1 and 30 hours to obtain a hard resin which is then post-cured in a second stage at a temperature between 90° C. and 200° C. for between 2 and 30 hours to obtain a finished very hard resin. The one-stage curing is preferred since it required less time to result in a finished product.

The invention will be further described with reference to the following experimental work.

In the examples to follow, unless otherwise indicated, the polyanhydride compound was prepared by the copolymerization of maleic anhydride and hexene-1. This copolymer was prepared by reacting hexene-1 and maleic anhydride in a molar ratio of about 2:1 in the liquid phase in the presence of a mutual solvent at a temperature between 60° and 100° C., using as a catalyst between 2 and 3 weight percent of benzoyl peroxide based on the maleic anhydride. The copolymer was then separated from the solvent and any residual catalyst, and then dried. Infrared analysis and nuclear magnetic resonance showed the hexene-1 and maleic anhydride to have combined in a 1:1 molar ratio. The dilute solution viscosities of the copolymer measured as noted above were between 0.04 and 1.15.

In all of the examples, the hardness was measured by the Barcol 935 instrument while the heat distortion temperature was determined by ASTM test D–648–56.

Example 1

In the run for this example, a sufficient amount of hexene-1-maleic anhydride copolymer described above was dissolved in glycidyl methacrylate so that the anhydride to epoxide ratio was 0.5. Fifty parts of styrene per 100 parts of the maleic anhydride-glycidyl methacrylate mixture were added to form a clear, homogeneous solution. This clear solution was poured into a sheet form 1/16 inch thick, cured to a solid by heating at 80° C. for 24 hours followed by post-curing at 150° C. for 24 hours. The volume resistivity of the sheet as measured by ASTM test No. D–257–61 was $470 \times 10^{13}$ ohms.

Example 2

Example 1 was repeated except the styrene was omitted. The volume resistivity dropped to $170 \times 10^{13}$ ohms.

A comparison of Examples 1 and 2 shows that the addition of an olefinically unsaturated monomer free of oxirane oxygen atoms results in an improvement in the volume resistivity characteristics of the resin. Further, the cured resins in both Examples 1 and 2 were hard and homogeneous.

Other alpha olefin-maleic anhydride copolymers, for example, those prepared from octene-1; dodecene-1; and octadecene-1, when substituted for the hexene-1 maleic anhydride copolymer give about the same results.

Example 3

Example 1 was repeated except methyl methacrylate was employed in place of the styrene. The volume resistivity of the cured sheet was $170 \times 10^{13}$.

A comparison of Examples 1, 2 and 3 shows that the second added olefinically unsaturated component must be free of oxirane oxygen atoms to be effective. The addition of 50 phr. of methyl methacrylate (no olefinically unsaturated compound containing an oxirane oxygen atom) give the same volume resistivity (Example 3) as when no additional olefinic component is employed (Example 2).

Example 4

Example 2 was repeated except the solution before curing was employed to prepare a laminate of 12 layers using glass cloth. The volume resistivity was reduced to $63 \times 10^{13}$ ohms.

Example 5

Example 1 was repeated with the same changes as in Example 4 above. The volume resistivity was reduced to $270 \times 10^{13}$ ohms, but was still higher than the volume resistivity of the composition without styrene cured as a sheet (Example 2).

Example 6

Example 5 was repeated except vinyl acetate was used in place of the styrene. The volume resistivity was $74 \times 10^{13}$ ohms.

A comparison of Examples 4, 5 and 6 shows that the addition of the second olefinically unsaturated monomer improves the volume resistivities of glass laminates made from the compositions of this invention, those laminates made from styrene (Example 5) being preferred.

When glycidyl acrylate is substituted in the above examples for glycidyl methacrylate, substantially the same results are obtained.

It is highly desirable in some applications, as noted above, for the resins to have excellent thermal stability properties. A resin has excellent thermal stability properties if it has a high heat distortion temperature as measured by ASTM test D–648–56. Conventional epoxy resins made from diepoxides and which are cured with amine catalysts have heat distortion temperatures on the order of 80° to 100° C. It is usually necessary to utilize aromatic type anhydrides and dianhydrides as curing agents for the epoxy resins in order to obtain finished resins having heat distortion temperatures in excess of 150° C. It has now been found that the above-described new liquid compositions of this invention can be converted to hard infusible resins having unexpectedly high heat distortion temperatures without the use of aromatic anhydride curing agents.

In accordance with this aspect of the invention, a new composition capable of being cured to a solid infusible resin having excellent hardness and thermal stability properties comprises a liquid solution at room temperature of a mixture of:

A solid compound containing at least two succinic anhydride groups and less than three conjugated double bonds when one of the conjugated double bonds is between the carbon atoms alpha to the carbonyl groups in a succinic anhydride group;

A soluble unconjugated tertiary amine;

An olefinically unsaturated compound free of oxirane oxygen atoms and containing as its only functional groups at least one olefinic double bond capable of polymerization by free radical means; and A liquid olefinically unsaturated mono-oxirane compound containing as its only functional groups, a single oxirane oxygen atom and an olefinic double bond capable of being polymerized by a free-radical means.

In one embodiment of this invention, a new resin composition having excellent thermal stability properties comprises the reaction product of a mixture of:

A solid polyanhydride containing at least two succinic anhydride groups and less than three conjugated double bonds when one of the conjugated double bonds is between the carbon atoms alpha to the carbonyl groups in a succinic anhydride group;

A soluble unconjugated teritary amine; an olefinically unsaturated compound free of oxirane oxygen atoms and containing at its only functional groups at least one olefinic double bond capable of polymerization by free-radical means; and A liquid olefinically unsaturated mono-oxirane compound containing as its only functional groups, a single oxirane oxygen atom and an olefinic double bond capable of being polymerized by a free-radical means; said polyanhydride and said tertiary amine being substantially completely dissolved in said olefinically unsaturated compound and said liquid monooxirane compound to form a liquid solution at a temperature less than the cure temperature.

While it is not certain, it is believed that the presence of the tertiary amine in the above-described compositions has a dual function in that it acts to accelerate the epoxide-anhydride crosslinking reaction at a lower temperature while at the same time inhibiting the thermal polymerization of both of the olefinically unsaturated compounds. Thus, it is believed that finished resins having unexpectedly high heat distortion temperatures are the result of the sequential method of curing the liquid compositions of this invention. That is, in order to obtain finished resins, i.e. finally cured resins, having the unexpectedly high heat distortion temperatures in addition to high hardness, it is necessary to first form a gel structure by substantially completely crosslinking the polyanhydride and the olefinically unsaturated monooxirane compounds only through the interaction of the anhydride and expoxide groups and then to further crosslink the resins by the polymerization of the olefinically unsaturated monooxirane compound and the olefinically unsaturated monomer free of oxirane oxygen atoms through their olefinic double bonds which are capable of polymerization by free-radical means. Once a gel structure forms due to the anhydride-epoxide crosslinking reaction, the added olefinically unsaturated compounds are not as free to move about and form a separate homopolymer phase. The resins are then believed to be further crosslinked by the internal polymerization of the olefinically unsaturated monooxirane compounds and the copolymerization of the crosslinked network with the olefinically unsaturated compounds free of oxirane oxygen atoms which olefinically unsaturated compounds may themselves be partially homopolymerized.

It has been found that the soluble tertiary amines, in order to be useful in the compositions of this invention, must be unconjugated. That is, the tertiary amines can be any soluble organic compound containing at least one tertiary amine group which is free of conjugation with respect to other tertiary amine groups, said orgonic compound having all of its nitrogen atoms present only as part of the tertiary amine groups. By free of conjugation with respect to other tertiary amine groups is meant that the nitrogen atom of one tertiary amine group is not connected to a nitrogen atom of another tertiary amine group through alternate single and double bonded atoms. The preferred tertiary amines are the monoamines containing only C, H and N. By a soluble tertiary amine is meant substantially completely soluble in the solution of the particular polyanhydride-olefinically unsaturated monoepoxide system employed.

One suitable class of tertiary amines can be represented by the general formula:

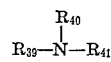

where $R_{39}$, $R_{40}$ and $R_{41}$ can be the same or different and can be selected from the group consisting of a hydrocarbon radical as defined above having between 1 and 37 carbon atoms, and a substituted hydrocarbon radical as defined having between 1 and 37 carbon atoms; and wherein the sum of the carbon atoms in $R_{39}$, $R_{40}$ and $R_{41}$ is less than 40; and wherein the term "alkyl" for $R_{39}$, $R_{40}$ and $R_{41}$ includes both saturated and unsaturated groups. Examples of suitable tertiary amines having the above formula include:

trimethylamine;
triethylamine;
N,N-dimethylaniline;
tri-n-hexylamine;
tri-n-heptylamine;
triphenylamine;
tri-n-decylamine;
alpha-methylbenzyldimethylamine;
N,N-diethylaniline;
N-ethyl-N-phenylbenzylamine;
N,N-dimethylbenzylamine;
N,N-diethylallylamine;
N,N-dimethylcyclohexylamine;
N,N-diphenylmethylamine;
N-methyl-N-phenylbenzylamine;
N,N-dimethyl-p-nitrosolaniline;
meta-diethylaminophenol;
dimethylaminomethylphenol;
N,N-diethyldodecylamine;
tridimethylaminomethylphenol;
dimethylaminoethyl methacrylate;
N,N-di-n-propylaniline;
N,N-diethyl-o-toluidine;
N,N-diethyl-p-toluidine;
N,N-dimethyl-l-naphthylamine;
N,N-diethyl-l-naphthylamine;
N-ethyl-N-methylaniline;
p-bromo-N,N-dimethylaniline;
p-bromo-N,N-diethylaniline;

N,N-dimethyl-m-toluidine;
N,N-diethyl-m-toluidine;
N,N-diethyl-2,4-dimethylaniline;
p-chloro-N,N-diethylaniline;
N,N-diethyl-2,5-dimethylaniline;
N-benzyl-N-ethyl-m-toluidine;
N,N-alpha-trimethylbenzylamine;
tri-n-propylamine;
tri-n-butylamine;
tri-isopentylamine;
tri-pentylamine;
N,N-dimethyloctadecylamine;
N,N-dimethyl-2-ethylhexylamine;
trioctylamine; and
tridodecylamine.

The preferred tertiary amines are the monoamines wherein the nitrogen atom of the amine group is one of the ring atoms in an aromatic ring. Particularly preferred are the single ring mono-tertiary amines wherein the nitrogen atom of the amine group is one of the ring atoms in an aromatic ring, i.e. the pyridine and substituted pyridines as represented by the formula:

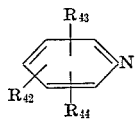

where $R_{42}$, $R_{43}$ and $R_{44}$ can be the same or different and are selected from the group consisting of hydrogen, a hydrocarbon radical as defined above having between 1 and 10 carbon atoms, and a substituted hydrocarbon radical as defined having between 1 and 10 carbon atoms; and wherein the term "alkyl" includes both saturated and unsaturated groups. Examples of suitable tertiary amines having the above formula include:

2-allylpyridine;
3-ethylpyridine;
4-ethylpyridine;
2-benzylpyridine;
2-isopropylpyridine;
4-phenylpyridine;
3-bromopyridine;
2-chloropyridine;
vinylpyridine;
2-picoline;
3-picoline;
4-picoline;
3,5-dicyanopyridine;
3,5-dimethylpyridine;
2,4-dimethylpyridine;
2,6-dimethylpyridine; and
2,4,6-trimethylpyridine.

It has been found that the use of conjugated tertiary amines, such as phenazine, results in a finally cured resin having thermal stability properties which are only slightly better than the properties of the finally cured resin cured solely by thermal means.

Examples of other suitable tertiary amines include:

N,N-diethyl-m-phenetidine;
N,N,N',N'-tetramethylmethylene diamine;
N,N,N',N'-tetramethyl-1,3-butane diamine;
N,N,N',N'-tetraethylethylene diamine;
triethylene diamine;
quinoline;
quinaldine;
2,6-dimethylquinoline;
2-chloroquinoline;
isopyrrole;
oxazole;
isothiazole;
1,2,3,4-trioxazole;
1,2,4-oxazine;
1,4-oxazine;
indolenine;
4-pyrindine;
indoxazine;
benzoxazole; and
acridine;

In accordance with the invention, one preferred way to achieve the above sequential curing is to add to the liquid solution of the defined polyanhydride, defined olefinically unsaturated compound free of oxirane oxygen atoms, and defined olefinically unsaturated monoepoxide, a soluble unconjugated tertiary amine. The curing must now be done in two stages, the second stage being at a higher temperature than the curing temperature in the first stage. The time and temperature of each stage of cure will vary over a wide range depending, among other things, on the reactivity of the particular olefinically unsaturated compound, unsaturated monoepoxide and polyanhydride employed, in addition to the amoung and type of tertiary amine in the composition. However, the tertiary amine acts to catalyze the anhydride-epoxide crosslinking reaction at a temperature less than would be possible in the absence of the tertiary amine. The rate of the crosslinking reaction is a direct function of the temperature employed and the amount of tertiary amine used. In addition, the crosslinking reaction is an exothermic reaction and means must be employed to control the temperature to avoid it getting so high that simultaneous polymerization of the olefinically unsaturated components, or even charring of the resin occurs. The temperature during the first stage cure is therefore preferably kept low, usually below 80° C. The preferred temperatures of curing in the first stage for the compositions containing a soluble tertiary amine are between 10° C. and 60° C. with the most preferred temperatures being room temperature (about 25° C.). The time of curing is dependent on the other variables, but is suitable between 0.1 and 50 hours, or more, and is usually between 0.5 and 24 hours.

The compositions become hard and infusible during the first stage of curing and increasing the temperature during the second stage of curing does not give rise to an exothermic reaction. The temperature of curing in the second stage must be high enough to overcome the polymerization inhibiting effect of the soluble tertiary amine. In general, the curing temperature during the second stage should exceed 80° C. and preferably be between 100° C. and 180° C., and more preferably about 150° C. The upper temperature limit should not exceed the thermal stability point of the resin which varies but is usually less than about 300° C. The time of curing is again dependent on the other variables, especially temperature and the amount of amine in the composition, but is generally between 0.1 and 100 hours with the usual curing time being between 0.5 and 24 hours.

The polymerization in the second stage curing above was initiated by thermal means. The polymerization can also suitably be promoted by other free-radical means, such as by ultrovioiet light radiation at lower temperatures, radiation by means of a Van de Graaff accelerator, radium or other means which give off atomic particles.

The amount of the soluble unconjugated tertiary amine to employ should be such that the polymerization of the olefinically unsaturated components is substantially inhibited until the polyanhydride and monoepoxide are substantially completely crosslinked through the interaction of the anhydride and epoxide groups. This amount will vary depending on the activities of the polyanhydride, olefinically unsaturated compound, unsaturated monoepoxide and tertiary amine and on the temperature of curing. In general, the higher the first stage curing temperature, the more amine is required for inhibition purposes, but this increased amount of amine promotes an exothermic anhydride-epoxide crosslinking reaction, as noted above, and means must be provided to control the temperature of curing within the desired limits. In general, the amount of soluble tertiary amine to employ will be between 0.01 and 20 parts by weight of amine per 100 parts of the polyanhydride-monoepoxide solution. The preferred concentration of tertiary amine is usually between 2 and 5 parts by weight per 100 parts of polyanhydride-monoepoxide solution.

The method of addition of the tertiary amine accelerators is critical. They must be added to the mixture of polyanhydride and monoepoxide after the polyanhydride is dissolved in the monoepoxide, since it normally takes longer for the solution of the polyanhydride in the monoepoxide than for the amine accelerators to harden the mixture. Consequently, if the amine is added first to the monoepoxide and the polyanhydride added to this mixture, the composition may harden before all of the polyanhydride is dissolved, and a grainy composition with inferior chemical and physical properties will result.

The invention will be further described with reference to the following specific examples.

In all of the examples to follow, unless otherwise specified, the polyanhydride employed was the maleic anhydride-hexene-1 copolymer described and used in Examples 1–6 above; the olefinically unsaturated compound is styrene; and the olefinically unsaturated monoepoxide was glycidyl methacrylate. Sufficient polyanhydride was dissolved in a mixture of styrene and the monoepoxide so that the A/E ratio was 0.5. The amine was added to the solution of the anhydride, styrene and the monoepoxide.

Example 7

In the run for this example, 3 phr. of 3-picoline was added to a solution of the hexene-1-maleic anhydride copolymer in glycidyl methacrylate. The solution was cured in a first stage for twenty-four hours at room temperature and for an additional twenty-four hours at 150° C. The finally cured resin had a hardness of 96 and a heat distortion temperature of 249° C.

A series of runs were made adding increasing amounts of styrene to the composition of Example 7 except 5 phr. of 3-picoline was employed and the first stage curing temperature was 100° C.

The results are summarized in Table I below:

TABLE I

| Example No. | Phr. of styrene Added | HDT, ° C. | Hardness, Barcol 935 |
|---|---|---|---|
| 8 | 1 | 225 | 94 |
| 9 | 5 | 231 | 94 |
| 10 | 10 | 231 | 94 |
| 11 | 20 | 221 | 95 |
| 12 | 30 | 222 | 95 |
| 13 | 50 | 195 | 94 |
| 14 | 75 | 159 | 93 |

A comparison of Examples 7–12 shows that the addition of from 1 to 30 phr. of styrene has surprisingly little effect on lowering the HDT of the finally cured resin. The addition of 50 and 75 phr. of styrene (Examples 13 and 14) reduces the HDT somewhat, but the HDT is still higher than can be obtained with commercial resins using amine curing agents. Further, it should be noted the addition of styrene does not lower the hardness of the resin even when 75 parts of styrene are added per hundred parts of resin (anhydride-monoepoxide mixture). It was expected that the hardness of the finally cured resin would be reduced greatly or at least as much as the thermal stability properties.

Example 15

Example 7 was repeated except the second stage curing temperature was reduced to 50° C. The resulting finally cured resin had a heat distortion temperature of 61° C.

A series of three runs were made adding 1, 5 and 10 phr. of methyl methacrylate and 1 phr. of benzoyl peroxide to the composition of Example 15. The results are summarized in Table II below.

TABLE II

| Example No. | Phr. of methyl Methacrylate | HDT, ° C. |
|---|---|---|
| 16 | 1 | 67 |
| 17 | 5 | 56 |
| 18 | 10 | 55 |

A comparison of Examples 15–18 shows that because of the low (50° C.) second stage curing temperature, all of the resins had low HDT's. The addition of methyl methacrylate, even in the added presence of benzoyl peroxide, was not able to result in a finally cured resin having a higher thermal stability when the second stage curing temperature is maintained below 80° C.

Examples 16–18 were repeated except styrene was used in place of methyl methacrylate. The results are shown in Table III below.

TABLE III

| Example No. | Phr. of styrene | HDT, ° C. |
|---|---|---|
| 19 | 1 | 60 |
| 20 | 5 | 56 |
| 21 | 10 | 56 |

A comparison of Examples 19–21 with Examples 16–18 shows that substantially the same results are obtained. Examples 15–21 show that the addition of an olefinically unsaturated compound does not reduce the thermal stability properties of the defined polyanhydride- unsaturated monoepoxide cured compositions.

As noted above, the compositions of the subject invention are useful in many applications, such as adhesives, encapsulation, etc. In yet another aspect of the subject invention, it has been found that the compositions of the subject invention make glass laminates having unexpectedly superior flexural strengths, chemical solvent resistance and weathering characteristics.

In accordance with this aspect of the invention, an article of manufacture has been found which possesses superior flexural strength, chemical and solvent resistance properties and weathering characteristics which comprise layers of a porous inert material impregnated and held together by the reaction product of a mixture comprising:

A solid compound containing at least two succinic anhydride groups and less than three conjugated double bonds when one of the conjugated double bonds is between the carbon atoms alpha to the carbonyl groups in a succinic anhydride group;

An olefinically unsaturated compound free of oxirane oxygen atoms and containing as its only functional groups at least one olefinic double bond capable of polymerization by free-radical means; and A liquid olefinically unsaturated monooxirane compound containing as its only functional groups a single oxirane oxygen atom and an olefinic double bond capable of being polymerized by free-radical means; said solid compound being substantially completely dissolved in said olefinically unsaturated compound and said liquid monoxirane compound to form a liquid solution at room temperature before said impregnation.

Laminating is the practice of laying together of a multiplicity of sheets of material and consolidating the sheets with some form of binder, such as an adhesive or synthetic resin into a unit structure. The core or base sheet material is usually fibrous in nature. The most common fibrous material for use in laminates is cellulose which in its most popular forms is paper, cotton and linen sheets. Any porous fibrous sheet material can suitably be used as the core or base material of the laminates, whether it be natural, as cotton, or synthetic as nylon. Wood veneer is also a suitable core material as is woven glass and other fabrics, asbestos paper, sisal, hemp, etc. Woven-glass fabric is the preferred core material for the laminates of this invention.

Woven glass fabrics are well known and readily available commercially. The fabrics come in different weaves, in various thicknesses and using various yarn sizes. The yarn is composed of "single yarns" twisted or plied together. The "single yarn" is composed of a multiplicity of glass filaments which are drawn through orifices in the bottom of a tank holding the liquid glass. The individual glass filaments are very abrasive and friable. As a result, a lubricant or finish, usually a starch-like material, must be applied to the filaments to permit them to eventually be woven. Various lubricants or finishes are applied by the manufacturers of woven-glass fabrics to enhance the usefulness of their products with particular types of adhesives. For example, some finishes are colored and would be undesirable for use where colorless products were wanted, or some finishes are chemically incompatible with the adhesive or resin to be applied. It is particularly desirable in preparing the laminates of this invention using a glass fabric core, that the glass fabric have a first coating or finish which chemically reacts under the conditions of curing with at least one of the components of the laminate binder composition. Particularly preferred are the silane finishes which are chemically bonded to the glass, but leave free reactive groups on the glass surface. These free reactive groups are preferably selected from the class consisting of vinyl groups ($CH_2=CH-$); $-OH$; $-NH_2$; $>NH$; and $-SH$.

The laminates can be prepared by any suitable procedure. The sheets of core material are impregnated or coated by any suitable means such as by brushing, or dipping, and the lay-ups can be made wet, that is, a multiplicity of the sheets are staked or laid one upon the other while the compositions of this invention are wet and sticky. The laminates are then consolidated by the application of heat and pressure, if desired. The application of heat and pressure in excess of 1,000 p.s.i.g., preferably 1,200 to 3,000 p.s.i.g., is the preferred curing procedure since the use of high pressures provides a method for controlling the binder or resin content of the laminate by squeezing out excess resin, and for obtaining laminates having unexpectedly high flexural strengths.

One of the features of the laminates prepared using the resin composite of this invention as a binder is that less total resin is required to achieve laminates having optimum physical properties. Usually, glass fabric core laminates prepared from commercial polyesters and diepoxy resins, such as Epon 828 (diglycidyl ether of bis-phenol A having an epoxide equivalent of 175–200), require a relatively high resin content of about 30 to 50 percent to obtain finished products having optimum physical properties. The glass fabric core laminates formed using the composition of this invention require less resin, usually between 15 and 30 percent for optimum properties. More or less resin can, of course, be used, for example, the resin content can vary between 5 and 80 weight percent of the total laminate.

For ease of preparation of the laminates, the viscosity of the liquid resin impregnating solution is important. One of the advantages of the compositions of this invention is that a liquid low viscosity olefinically unsaturated compound free of oxirane oxygen atoms can be chosen, such as styrene which will reduce the viscosity of the impregnating solution and allow the use of higher viscosity and, indeed, solid unsaturated monoepoxides; allow the use of higher molecular weight polyanhydrides and finally allow the use of impregnating solutions having higher $A/E$ ratios. When an impregnating solution is prepared by dissolving the defined polyanhydride in a liquid unsaturated monooxirane compound, the viscosity of the solution is too high to be a workable liquid when the $A/E$ ratio exceeds about 1:1. By the addition of the reactive liquid olefinically unsaturated monomeric compounds defined above, it is possible to prepare impregnating solutions where the $A/E$ ratio is as high as 5, but is usually between 2.0 and 0.25.

The particularly preferred olefinically unsaturated compounds free of oxirane oxygen atoms which are useful in the preparation of laminates are the liquid low viscosity olefins, such as styrene and methyl methacrylate. By low viscosity is meant those having a viscosity at 25° C. of less than 500 cps.

In general, the preferred composition for preparing a laminate is a composition wherein the $A/E$ ratio is between 1.5 and 0.5 and the amount of the liquid olefinically unsaturated compound is between 10 and 200 phr.

The curing of the laminates occurs by heating the laminate for at least a portion of the time under an increased pressure at a temperature above 80° C. The preferred curing pressure is above 15 p.s.i., most preferably between 100 and 500 p.s.i. The temperature of curing can be between 80° C. and 250° C., preferably between 100° C. and 200° C. for times as short as one minute or less to 10 to 50 hours, or more. Usually the curing is in two stages, the first being under the increased pressures for between one minute or less to 10 minutes, followed by a slower cure at atmospheric pressure for times between one and 30 hours. If it is desired that the article of manufacture have high thermal stability, then the sequential curing defined above using the above-defined amine catalysts in the above-described amounts can be employed. The use of the amine catalysts is not preferred since the catalyst tends to promote premature thermosetting and, quite unexpectedly, results in finally cured laminates having inferior solvent resistance properties.

This aspect of the invention will be further described with reference to the following experimental work.

The liquid uncured resin solution for use as a binder for the laminates was prepared by dissolving a sufficient amount of the maleic anhydride-hexene-1 copolymer described above in glycidyl methacrylate or a mixture of glycidyl methacrylate and styrene or methyl methacrylate to obtain an $A/E$ ratio of either 0.5; 1.0 or 1.5. The solution was applied by brush to 9 x 9 inch squares of glass fabric No. 181 having an A-1100 amino silane finish obtained from the United Merchants Fabrics Division of United Merchants & Manufacturers, Inc. Additional sheets of the glass fabric and resin were applied until twelve sheets of fabric core were stacked together with the resin coating in between. The fabric sheets were placed upon one another so that the longest strands of the woven fabric were oriented in the same direction.

The laminates were cured or consolidated by the application of heat and pressure in a first stage, followed by additional heating at a higher temperature in a second stage.

Example 22

In the laminate prepared for this example, no catalyst was used in the resin composition. The laminate was cured for twenty-four hours at 100° C. using a pressure of 19,000 p.s.i.g., followed by curing in a second stage for twenty-four hours at 150° C. at atmospheric pressure. The resulting laminate had a flexible strength as measured by ASTM test D-790-49-T of 89,600. The resin content of the finished laminate was 22.4 percent by weight.

Example 23

Example 22 was repeated except 50 phr. of styrene was also added, along with 1 phr. of benzoyl peroxide, and the first stage cure temperature was reduced to 80° C. The resulting finally cured resin had a flexural strength of 74,400 p.s.i., showing that the addition of styrene in this amount (33 percent of the total weight of the finished resin) did not have a detrimental effect on the excellent flexural strengths of the resins.

Example 24

Example 23 was repeated except methyl methacrylate was used in place of styrene. Substantially the same results were achieved in that the finally cured laminate had a flexural strength of 72,600 p.s.i.

Example 25

Example 24 was repeated except the A/E ratio was increased to 1.0. The solution was fluid and easily workable. The finally cured laminate had a flexural strength of 85,800 p.s.i.

Example 26

Example 23 was repeated except the amount of styrene was increased to 100 phr. and the A/E ratio was increased to 1.5. Despite this high A/E ratio (1.5), the solution was workable upon the addition of 100 phr. of styrene. The final resin was therefore 50 percent by weight styrene. The finally cured resin had a flexural strength of 69,000 p.s.i. which is extremely high considering that 50 percent of the final resin by weight is styrene. The flexural strength of pure polystyrene is only about 10,000.

Example 27

Example 26 was repeated except the amount of styrene was increased to 150 phr. The finally cured resin again had a flexural strength of 69,000 p.s.i.

A comparison of Examples 22 through 27 shows the addition of olefinically unsaturated compounds even in amounts as high as 60 percent of the resin (Example 27) does not greatly reduce the flexural strengths of the resin as expected.

The laminates described in Examples 22 through 27 were tested for thermal and solvent resistance properties using as individual solvents—sulfuric acid having an $H_2SO_4$ content of 20 percent; 10 percent sodium hydroxide solution; water and isooctane. The laminates were immersed in each of the solvents and solutions for a period of four days at a temperature of 71° C. and their flexural strength again determined. The thermal treatment consisted of heating the laminates at 260° C. for 30 minutes. The flexural strength of each of the laminates from Example 22 through 27 after each of the above treatments is summarized in Table IV below.

TABLE IV

| Treatment | Flexural strength, p.s.i.×10⁻³ Laminates From Example No. — | | | | | |
|---|---|---|---|---|---|---|
| | 22 | 23 | 24 | 25 | 26 | 27 |
| Thermal, 260° C.: | | | | | | |
| (a) For 30 minutes | 83.2 | 72.8 | 23.8 | 48.4 | 62.4 | 58.3 |
| (b) For 8 days | ¹0 | 3.4 | | | 1.5 | 5.3 |
| 20% $H_2SO_4$ | 42.1 | 58.6 | 20.5 | 25.0 | 49.6 | 19.6 |
| 10% NaOH | 12.9 | 18.3 | 14.4 | 9.6 | 11.4 | 18.2 |
| Water | 78.0 | 75.9 | 65.0 | 66.5 | 70.5 | 65.8 |
| Isooctane | 84.0 | 73.4 | 70.0 | 74.2 | 68.0 | 60.5 |
| Blank | 89.6 | 74.4 | 72.6 | 85.8 | 69.0 | 69.0 |

¹ Delaminated.

Referring to Table IV, the binder composition for the laminate for Example 22 consisted of glycidyl methacrylate and a hexene-1-maleic anhydride copolymer wherein the A/E ratio was 0.5. The binder for Example 23 is the same as in Example 22 except it contains, in addition, 50 phr. of styrene. A comparison of the results of Examples 22 and 23 shows the addition of styrene aids in the retention of flexural strength properties in the presence of solvents and after heat treatment. Both laminates were adversely affected by the NaOH but the styrene laminates to a lesser extent.

The laminates in Examples 24 and 25 which used methyl methacrylate in place of styrene exhibited excellent properties except with respect to resistance to sulfuric acid and high heat.

Styrene was again employed in the laminates in Examples 26 and 27 with increased A/E ratios and amounts compared to Example 23. Again the properties of the laminates were excellent, especially considering that in Example 27, sixty percent of the binder was styrene.

A series of laminates were prepared and tested for weathering characteristics by ASTM test D–1499–64. The purpose of this test is to determine if the flexural strengths of the laminates decrease and if discoloration and swelling will occur. The laminates were prepared as described above with varying amounts of styrene being added as the olefinically unsaturated compound. For comparison purposes, several laminates were prepared using commercially available polyepoxies. The details of the binder composition for the laminates and the results of the weatherometer test are given in Table V below.

TABLE V

| Example No. | Binder composition | A/E | Styrene, phr. | Flexural strength, p.s.i.×10⁻³ | |
|---|---|---|---|---|---|
| | | | | Final | Initial |
| 28 | MAC-6¹+GM² | 0.5 | 0 | 74.7 | 76.4 |
| 29 | MAC-6+GM | 0.5 | 50 | 80.6 | 74.4 |
| 30 | MAC-6+GM | 0.8 | 50 | 89.1 | 83.3 |
| 31 | MAC-6+GM | 0.8 | 100 | 74.4 | 57.3 |
| 32 | MAC-6+GM | 1.2 | 100 | 80.1 | 69.5 |
| 33 | Epon 828³+PA⁴ | 0.75 | 0 | 90.6 | 98.6 |
| 34 | Selectron⁵ | | 0 | 15.1 | 51.7 |

¹ (MAC-6)—The polyanhydride prepared as described above by the reaction of maleic anhydride with hexene-1.
² (GM)—Glycidyl methacrylate.
³ Epon 828 is trade name of Shell diepoxy resins prepared by the reaction of epichlorohydrin with Bisphenol A.
⁴ (PA)—Phthalic anhydride.
⁵ Selectron is trade name of a polyester resin from Pittsburgh Plate Glass Company.

Referring to Table V, the binder compositions for Examples 29–32 also contained 1 phr. of benzoyl peroxide. The laminate tested in Example 29 was the same laminate described in Example 23. The appearance of all of the laminates in Examples 28–32 remained unchanged. The Epon 828 laminate (Example 33) discolored while the Selectron bound laminate was discolored and badly swollen. No swelling occurred for the laminates in Examples 28 through 33. It is to be noted that in all cases except where styrene was added, the flexural strength decreased after the weatherometer test, albeit slightly for Examples 28 and 33. When styrene was added, the flexural strengths actually increased after the weatherometer test. These results were quite unexpected especially for Examples 31 and 32 where considerable increases in flexural strengths were achieved.

The same laminates described in Examples 28 through 34 were subjected to heat tests to determine whether they could retain their flexural strengths. These heat tests were in accordance with ASTM Test No. D–2115–62T and D–1870–61T. The results of these experiments are shown in Table VI below.

TABLE VI

| | Flexural strength, p.s.i.×10⁻³ | | | |
|---|---|---|---|---|
| | Test | | | |
| Example No. | None | ½ hr. at 500° F. | None | 8 days at 500° F. |
| | Flexural at— | | | |
| | Room temp. | Room temp. | 500° F. | 500° F. |
| 35 | 76.4 | 51.7 | 14.0 | (¹) |
| 36 | 74.4 | 72.8 | 8.3 | 3.4 |
| 37 | 83.3 | 68.7 | 14.1 | |
| 38 | 57.3 | 49.8 | 9.1 | |
| 39 | 69.5 | 72.4 | 10.5 | |
| 40 | 90.6 | 81.9 | 11.8 | 19.9 |
| 41 | 51.7 | 38.8 | 4.1 | 2.3 |

¹ Delaminated.

Referring to Table VI, the laminates for Examples 35 through 41 were the same laminates used in Examples 28 through 34 respectively in Table V. The data in Table VI show the laminates made from the resin compositions of this invention hold up very well in these heat tests compared with a laminate (Example 35) prepared from a resin composition without styrene and compared to laminates prepared from commercially available epoxy resins (Examples 40 and 41). It appears from the data (comparing Examples 36 through 39) that the best compositions for the preparation of laminates are those with the higher A/E ratios and larger amounts of added styrene. When the A/E ratio was 1.2 and the styrene content 100 phr. (Example 39 in Table VI and Example 32 in Table V), the finally cured laminate has the best resistance to heat and weathering.

In addition to the above experiments, runs were made to determine whether the finally cured resinous compositions of this invention possessed good solvent and chemical resistance since these properties are essential for a commercially acceptable material for some applications. The base composition (Example 42 in Table VII below) to which the other compositions were compared was prepared by dissolving a sufficient amount of the maleic anhydride-hexene-1 copolymer described above (see Examples 1–24) in glycidyl methacrylate so that the $A/E$ ratio was 0.5. Phenothiazine in the amount of 0.5 phr. and 3-picoline in the amount of 3 phr. were added as catalysts and the composition was poured into sheets $\frac{1}{16}$ inch thick and cured at room temperature for twenty-four hours followed by a post curing at 150° F. for twenty-four hours. The compositions for Examples 43, 44 and 45 in Table VII below were exactly the same as the base composition in Example 42 except the amount of 3-picoline was increased to 5 phr. and 5, 30 and 50 phr. of styrene was added respectively.

The compositions were tested for their resistance to various solvents and chemicals by suspending at room temperature a preweighed 1-inch x 3-inch strip of each of the compositions in the particular solvent or chemical and weighing the strips after certain elapsed time periods to determine the weight gain. The less gain in weight, of course, means a better solvent or chemical resistance. The results of this series of tests are shown in Table VII below.

TABLE VII

| Gain in weight (wt. percent) in— | Example No. | | | |
|---|---|---|---|---|
| | 42 | 43 | 44 | 45 |
| Water in— | | | | |
| 10 days | 2.2 | 1.9 | 1.6 | 1.2 |
| 24 days | 2.6 | 2.4 | 1.9 | 1.2 |
| Acetone in— | | | | |
| 10 days | 0.35 | −0.1 | −0.1 | 0.6 |
| 24 days | 0.75 | −0.1 | +0.2 | 1.4 |
| Toluene in— | | | | |
| 10 days | 0.4 | −0.4 | −0.4 | +0.5 |
| 24 days | 0.4 | −0.5 | −0.5 | +0.4 |
| Aqueous, 10% NaCl in— | | | | |
| 10 days | 1.9 | 1.6 | 1.3 | 1.0 |
| 24 days | 2.3 | 2.0 | 1.4 | 1.0 |
| Aqueous, 10% NaOH in— | | | | |
| 10 days | 1.4 | 1.3 | 1.2 | 0.9 |
| 24 days | 1.9 | 1.8 | 1.4 | 1.0 |
| Aqueous, 10% HCl in— | | | | |
| 10 days | 2.1 | 1.7 | 1.4 | 0.9 |
| 24 days | 2.5 | 2.2 | 1.6 | 1.0 |
| Household bleach in— | | | | |
| 10 days | 2.1 | 1.5 | 1.4 | 0.9 |
| 24 days | 2.3 | 1.6 | 1.7 | 1.0 |
| Aqueous ammonia in— | | | | |
| 10 days | 3.1 | 2.6 | 2.3 | 1.6 |
| 24 days | 4.5 | 4.2 | 3.4 | 2.4 |

Referring to Table VII, it can be seen that the addition of styrene to the base composition (Example 42) improves the chemical and solvent resistance. Resistance to acetone and toluene was particularly outstanding, the gain in weight being only about 0.5 percent in 24 days. In water and aqueous solutions of acids and bases the gain in weight was consistently about 1.5 percent for the resin containing 50 phr. of styrene and slightly higher (2–3 percent) as the styrene content was reduced. The consistency of the results indicates water and not the chemicals is causing the weight increase.

Finally, the gain in weight for the resin containing 50 phr. of styrene in aqueous ammonia was only 3 percent. As the styrene content decreased, the gain in weight increased to a maximum of about 5 percent. This test with aqueous ammonia is a particularly strenuous test in which most resins prepared from diepoxy molecules fail. Thus, the solvent and chemical resistance of the compositions of this invention is particularly outstanding.

As noted above, the resinous compositions of this invention when cured are homogeneous. That is, the components of the composition are chemically combined with each other rather than being separate polymer phases which are physically admixed. As a result, the resinous compositions have a substantially uniform structure. Since the components of the compositions are chemically combined, the finally cured resin is substantially completely insoluble in a solvent, such as acetone and methyl ethyl ketone, for the homopolymer of the added olefinically unsaturated oxirane oxygen free monomer. By substantially completely insoluble is meant that less than 10 weight percent of the added olefinically unsaturated oxirane oxygen free monomer would be extracted from the cured resin. For example, a resin prepared as in Example 2 above which contained no added styrene was extracted with acetone for 24 hours and suffered a weight loss of 0.37 percent. While it is not certain, it is believed this small weight loss may be the result of the extraction of small amounts of unreacted monoepoxide from the cured resin. When 10 phr. of styrene was added to an uncured composition of Example 2 above and then cured in the same manner, the resulting resin suffered a weight loss of 0.41 weight percent when extracted with acetone for 24 hours. Even if the weight loss is attributed solely to the added styrene, it amounts to only about 4 weight percent of the added styrene. Surprisingly, when 50 phr. of styrene was added (as in Example 1 above), the resulting resin suffered a weight loss of only 0.012 percent on extraction with acetone for 24 hours. This extremely small weight loss, which is more than 30 times less than the weight loss of the resin without added styrene, is believed to be the result of a more intimate chemical combination of components so that lesser amounts of unreacted monoepoxide are present in the finally cured resin. This result was most unexpected and provides another advantage for the compositions of this invention.

To emphasize the fact that the components of the compositions are chemically combined, 5 and 10 phr. of polystyrene were added to the composition of Example 2 and the finally cured resins after extraction, as above, suffered weight losses of 2.6 percent and 2.19 percent respectively. These weight losses amounted to about 33 and 50 weight percent of the added polystyrene, showing that the polystyrene was not chemically combined but was merely physically admixed.

Resort may be had to such variations and modifications as fall within the spirit of the invention and the scope of the appended claims.

I claim:
1. A new composition comprising a liquid solution at below the cure temperature of a mixture of:
   a solid compound containing at least two succinic anhydride groups and less than three conjugated double bonds when one of the conjugated double bonds is between the carbon atoms alpha to the carbonyl groups in a succinic anhydride group;
   an olefinic unsaturated monooxirane compound containing as its only functional groups a single oxirane oxygen atom and an olefinic double bond capable of being polymerized by free-radical means; and
   an olefinically unsaturated monomer free of oxirane oxygen atoms and containing as its only functional groups at least one olefinic double bond capable of polymerization by free-radical means;
   said liquid solution capable of being cured to a solid infusible resin through reaction of the anhydride and epoxide groups and interaction of the olefinic double bonds of the olefinically unsaturated components.

2. A composition according to claim 1 comprising in addition, a soluble unconjugated tertiary amine.

3. A composition according to claim 1 wherein said solid compound is a solid polymer having at least two succinic anhydride groups produced by the copolymerization of:
   an unsaturated derivative of succinic anhydride, and
   an organic monoolefin having between 2 and 40 carbon atoms per molecule;

said olefinically unsaturated monooxirane compound, is an alpha-olefinically unsaturated terminal monoepoxide represented by the general formula:

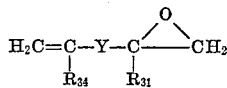

where $R_{35}$ is selected from the group consisting of hydrogen and a saturated hydrocarbon radical having between 1 and 10 carbon atoms; where $R_{34}$ is selected from the group consisting of hydrogen; halogen; —C≡N;

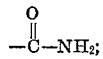

—COOR″, where R″ is any saturated hydrocarbon radical having between 1 and 10 carbon atoms; and

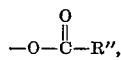

where R″ is as defined when Y is selected from the group consisting of

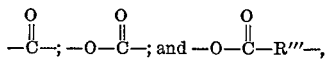

where R‴ is any divalent organic radical having between 1 and 20 carbon atoms; and where $R_{34}$ is selected from the group consisting of a saturated hydrocarbon radical having between 1 and 10 carbon atoms; hydrogen; halogen;

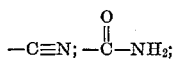

—COOR″, where R″ is as defined; and

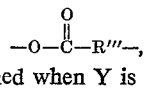

where R‴ is as defined when Y is

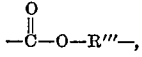

where R‴ is any divalent organic radical having between 1 and 20 carbon atoms; and the olefinically unsaturated monomer free of oxirane oxygen atoms is selected from the class consisting of:

(1) vinyl monomers having the general formula:

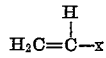

where x can be any aryl group having between 1 and 3 rings; halogen;

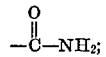

—C≡N; —$OR_{36}$, where $R_{36}$ is any hydrocarbon radical having between 1 and 20 carbon atoms which can be substituted by halogen and —C≡N groups;

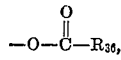

where $R_3$ is as defined; and

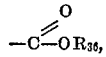

where $R_{36}$ is as defined;

(2) beta substituted propylenes having the general formula:

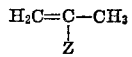

where Z is selected from the class consisting of

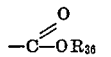

where $R_{36}$ is as defined; —C≡N; and

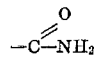

and (3) vinylidene compounds having the general formula:

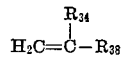

where $R_{37}$ and $R_{38}$ can be the same or different and are selected from the class consisting of —C≡N and halogen.

4. A composition according to claim 3 wherein said solid polymer is produced by the copolymerization of:
an unsaturated dicarboxylic acid anhydride having the general formula:

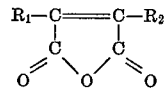

wherein $R_1$ is a member selected from the group consisting of hydrogen, halogen, a hydrocarbon radical, and a substituted hydrocarbon radical and $R_2$ is selected from the group consisting of hydrogen and halogen atoms; and an olefinic compound having the general formula:

where $R_3$ is selected from the group consisting of hydrogen, halogen, a hydrocarbon radical and a substituted hydrocarbon radical; and $x_1$ and $x_2$ are selected from the group consisting of hydrogen halogen, a hydrocarbon radical, a substituted hydrocarbon radical, and —OR, where R is a hydrocarbon radical.

5. A composition according to claim 4 wherein the solid polymer is produced by the copolymerization of maleic anhydride and an alpha olefin having between 2 and 30 carbon atoms, and the olefinically unsaturated monooxirane compound has the formula:

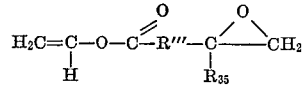

where $R_{35}$ is selected from the group consisting of hydrogen and a saturated hydrocarbon radical having between 1 and 10 carbon atoms, and R‴ is a divalent hydrocarbon radical having between 1 and 20 carbon atoms.

6. A composition according to claim 5 wherein the alpha olefin is hexene-1 and the monooxirane compound is glycidyl methacrylate.

7. A composition according to claim 5 wherein the olefinically unsaturated monomer free of oxirane oxygen atoms is represented by the general formula:

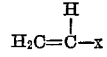

where x can be any aryl group having between 1 and 3 rings; halogen;

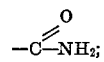

—C≡N; —$OR_{36}$, where $R_{36}$ is any hydrocarbon radical having between 1 and 20 carbon atoms which can be substituted by halogen and —C≡N groups;

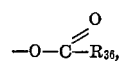

where $R_{36}$ is as defined; and

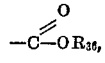

where $R_{36}$ is as defined.

8. A composition according to claim 7 wherein the olefinically unsaturated monomer free of oxirane oxygen atoms is a styrene-type compound.

9. A composition according to claim 8 wherein the styrene-type compound is styrene.

10. A composition according to claim 7 wherein the A/E ratio is between 0.1:1 and 5:1 and the amount of olefinically unsaturated monomeric compound free of oxirane oxygen atoms is between 1 and 200 parts per 100 parts of resin by weight.

11. A composition according to claim 10 comprising, in addition, between 0.01 and 20 parts by weight of a tertiary amine having the formula:

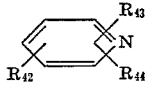

where $R_{42}$, $R_{43}$ and $R_{44}$ can be the same or different and are selected from the group consisting of hydrogen, a hydrocarbon radical having between one and ten carbon atoms and a substituted hydrocarbon radical having between one and ten carbon atoms.

12. A composition according to claim 11 wherein the tertiary amine is 3-picoline.

13. The cured reaction product of a composition according to claim 1.

14. The cured reaction product of a composition according to claim 2.

15. The cured reaction product of a composition according to claim 5.

16. The cured reaction product of a composition according to claim 6.

17. The cured reaction product of a composition according to claim 9.

18. The cured reaction product of a composition according to claim 2 wherein the monooxirane compound reacts initially substantially completely through the oxirane oxygen with the anhydride groups of said solid compound and then reacts through the olefinic double bonds of the monooxirane compound and the olefinically unsaturated compound free of oxirane oxygen atoms.

19. A method of preparing a solid infusible resin having a high heat distortion temperature which comprises:
forming a liquid solution of a solid compound containing at least two succinic anhydride groups and less than three conjugated double bonds when one of the conjugated double bonds is between the carbon atoms alpha to the carbonyl groups in a succinic anhydride group, a liquid olefinically unsaturated monooxirane compound containing as its only functional groups a single oxirane oxygen atom and an olefinic double bond capable of being polymerized by free-radical means, and a liquid olefinically unsaturated monomer free of oxirane oxygen atoms and containing as its only functional groups at least one olefinic double bond capable of polymerization by free radical means;
crosslinking said solid compound and said monooxirane compound substantially only by reacting the oxirane oxygen atom with the anhydride groups; and
thereafter polymerizing said monooxirane compound and said oxirane oxygen free monomer at a temperature of at least 80° C.

20. A method according to claim 19 wherein said liquid solution contains, in addition, a soluble unconjugated tertiary amine.

21. A method according to claim 19 wherein the A/E ratio is between 0.5:1 and 1.5:1.

22. An article of manufacture which comprises layers of a porous inert material impregnated and held together by the reaction product of a mixture comprising:
a solid compound containing at least two succinic anhydride groups and less than three conjugated double bonds when one of the conjugated double bonds is between the carbon atoms alpha to the carbonyl groups in a succinic anhydride group;
a liquid olefinically unsaturated monoxirane compound containing as its only functional groups a single oxirane oxygen atom and an olefinic double bond capable of being polymerized by free radical means; and
a liquid olefinically unsaturated monomer free of oxirane oxygen atoms and containing as its only functional groups at least one olefinic double bond capable of polymerization by free radical means;
said solid compound being substantially completely dissolved in said liquid olefinically unsaturated monomers to form a liquid solution before said impregnation.

23. An article of manufacture according to claim 22 wherein the porous inert material is glass fabric, the solid compound is a copolymer of maleic anhydride and hexane-1 which has at least two anhydride groups, the liquid olefinically unsaturated monooxirane compound is glycidyl methacrylate, and the liquid olefinically unsaturated monomer free of oxirane oxygen atoms is styrene.

24. A composition according to claim 5 wherein the olefinically unsaturated monomer free of oxirane oxygen atoms is represented by the general formula:

$$H_2C=C-CH_3$$
$$|$$
$$Z$$

where Z is selected from the class consisting of

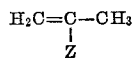

where $R_{36}$ is as defined;

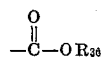

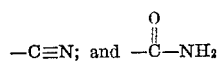

25. A composition according to claim 24 wherein the olefinic monomer is methyl methacrylate.

26. A composition according to claim 5 wherein the olefinically unsaturated monomer free of oxirane oxygen atoms is selected from the group consisting of a styrene-type compound, lower alkyl acrylates and lower alkyl methacrylates.

References Cited

UNITED STATES PATENTS 3,374,209   3/1968   Hay et al. _____ 260—78.4

JOSEPH L. SCHOFER, *Primary Examiner.*

JOHN KIGHT, *Assistant Examiner.*

U.S. Cl. X.R.

117—124, 140, 143, 145, 147, 148, 155, 161

PO-1050
(5/69)

UNITED STATES PATENT OFFICE
CERTIFICATE OF CORRECTION

Patent No. 3,441,543           Dated    April 29, 1969

Inventor(s)   William J. Heilman

It is certified that error appears in the above-identified patent and that said Letters Patent are hereby corrected as shown below:

Column 5, line 1, "safe" should read --same--; and line 45, "isophopenyl" should read --iospropenyl--. Column 13, line 15, "of" should be --or--; and line 30, "saturated" should read --unsaturated--. Column 14, line 54,"(N-p-anisyl)methacrylamide)" should read --(N-(p-anisyl)methacrylamide)--. Column 15, line 1, "$CO_2=C-CH_2$" should read --$CH_2=C-CH_2$--. Column 18, line 47, "no" should read --an--; and line 48, "an" should read --no--. Column 21, about line 36, in the list of compounds, the first word "pyridine" has been omitted. Column 22, line 18, "amoung" should read --amount--. Column 25, line 41, "composite" should read --composition--. Column 26, line 55, "flexible" should read --flexural--. Claim 3, column 31, line 6, "$H_2C = \underset{R_{34}}{C} - Y - \underset{R_{31}}{C}\overset{O}{\diagdown}CH_2$" should read -- $H_2C = \underset{R_{34}}{C} - Y - \underset{R_{35}}{C}\overset{O}{\diagdown}CH_2$ --;

and column 31, line 58, "where $R_3$" should read --where $R_{36}$--; and column 32, line 3, "$H_2\underset{R_{34}}{\overset{|}{C}}=C-R_{38}$" should read -- $H_2\overset{R_{37}}{\underset{|}{C}}=C-R_{38}$ --.

SIGNED AND
SEALED

MAR 17 1970

(SEAL)
Attest:

Edward M. Fletcher, Jr.
Attesting Officer

WILLIAM E. SCHUYLER, JR.
Commissioner of Patents